United States Patent [19]
Keutz

[11] Patent Number: 5,734,210
[45] Date of Patent: Mar. 31, 1998

[54] INDICATING DEVICE

[75] Inventor: Markus Keutz, Rossdorf, Germany

[73] Assignee: VDO Adolf Schindling AG, Frankfurt, Germany

[21] Appl. No.: 545,986

[22] Filed: Oct. 20, 1995

[30]   Foreign Application Priority Data

Jan. 11, 1995 [DE] Germany ............... 195 00 570.8

[51] Int. Cl.$^6$ ............... H02K 37/00; H02K 7/06; H02K 16/00
[52] U.S. Cl. ............... 310/49 R; 310/80; 310/83; 310/114; 73/490
[58] Field of Search ............... 310/12, 80, 82, 310/83, 49 R, 112, 114; 73/490

[56]   References Cited

U.S. PATENT DOCUMENTS

| | | | |
|---|---|---|---|
| 2,548,731 | 4/1951 | Lehde | 172/36 |
| 3,597,915 | 8/1971 | Aizawa | 58/23 D |
| 3,779,086 | 12/1973 | Myrent et al. | 73/490 |
| 4,017,964 | 4/1977 | Schulte et al. | 29/596 |
| 4,065,685 | 12/1977 | Newell | 310/49 R |
| 4,104,859 | 8/1978 | Ogihara et al. | 58/23 D |
| 4,167,848 | 9/1979 | Kitai et al. | 58/23 D |
| 4,199,699 | 4/1980 | Kume et al. | 310/49 R |
| 4,288,710 | 9/1981 | Hamilton | 310/49 R |
| 4,393,319 | 7/1983 | Bock | 310/80 |
| 4,489,600 | 12/1984 | Han | 73/275 |
| 5,233,247 | 8/1993 | Stark | 310/83 |
| 5,325,736 | 7/1994 | Tsujita | 74/425 |

FOREIGN PATENT DOCUMENTS

| | | |
|---|---|---|
| 2156226 | 5/1973 | France. |
| 3323604 | 1/1985 | Germany. |
| 3937149 | 5/1990 | Germany. |

OTHER PUBLICATIONS

Patent Abstracts of Japan, vol. 18, No. 436 (P–1786), Aug. 15, 1994 & JP–A–06 137890 (Yazaki), May 20, 1994.

*Primary Examiner*—Steven L. Stephan
*Assistant Examiner*—Michael J. Wallace, Jr.
*Attorney, Agent, or Firm*—Martin A. Farber

[57]   ABSTRACT

In an indicating device having a stepping-motor drive, an indicating element can be driven by a gear wheel which is in engagement with a worm which is connected with a stepping motor by a worm shaft. The stepping motor is preferably formed of two stators, and of two permanent-magnet rotors which are arranged, fixed for rotation, on the two ends of the worm shaft. The rotors are arranged with half a pole spacing apart, preferably 90°.

14 Claims, 2 Drawing Sheets

INDICATING DEVICE

FIELD AND BACKGROUND OF THE INVENTION

The present invention relates to an indicating device driven by a stepping motor.

Indicating devices driven by a stepping motor are frequently used for indicating values of measurements provided in the form of digital signals. The stepping motor is connected by a gear to an indicating element of the indicating device. The indicating element is generally developed as a pointer. The purpose of the gear is to provide a torque which is sufficiently high to actuate the indicating element. Furthermore, the gear serves to reduce the size of a step movement of the indicating element. Both of these functions require a relatively high step-down ratio, which is obtained in known indicating devices by a multi-stage spur-gear system.

For the same step-down ratio and size of the driven gear, the known indicating devices with spur gears require more than one gear stage, which leads to a large number of parts and thus to a greater expense, a higher noise level, and reduced precision of the indication.

SUMMARY OF THE INVENTION

It is an object of the present invention to avoid these disadvantages and, in particular, to permit the flattest possible compact structural form of the drive for the indicating device.

According to the invention, the indicating device can be driven by a gear wheel (1) which is in engagement with a worm (3) which is connected by a worm shaft (4) to a stepping motor (7–10).

The indicating device of the invention furthermore has the advantage that fewer structural parts than with the known indicating devices having multi-stage spur gears. By a self-locking of the worm, with suitable design, a holding of the indicating element, particularly advantageous for large pointers, is possible without use of electric current. The indicating device of the invention is suitable for different types of indicating elements, for instance disks and digit rollers.

However, in a preferred embodiment the indicating element is a pointer which is arranged, fixed for rotation, on a shaft (2) which bears the gear wheel (1). This embodiment is excellently suited for indicating instruments such as tachometers, speedometers, and level gauges.

Advantageous embodiments of the indicating device of the invention have a construction wherein the gear wheel (1) is provided with a spring (19) to take up any gearing play and may also be provided with stops (23, 24) which limit the angle of rotation.

In a further development of the indicating device of the invention, the gear wheel (1) is provided on both sides with run-on domes (25), and is disposed on a shaft (2) which protrudes further beyond the gear wheel (1) on one side of the gear wheel (1) than on the other side. In this way, by different amounts of insertion of the gear wheel upon the assembling of the indicating device of the invention, the pointer shaft can extend as desired from the housing on either of its two sides. Thereby, with a given electric control, rotation in clockwise direction or in counterclockwise direction can be provided.

Another aspect of the invention contributes to a particularly flat shape by a forming of the stepping motor of two permanent-magnet rotors (7; 8) arranged fixed for rotation on the two ends of a worm shaft (4), and two stators (9; 10). The rotors (7; 8) are arranged spaced from each other in rotation about their common axis by half a pole spacing, preferably 90°.

In particular, the worm shaft (4) is supported in the immediate vicinity of the ends of the worm (3) by, in each case, a bearing bracket (5; 6), and the bearing brackets (5; 6) are developed in one piece with a housing (11) and are open to permit a snapping-in of the worm shaft (4) for positioning the worm shaft. In this way, axial play of the worm shaft is avoided.

In accordance with another feature of the indicating device of the invention, a housing which encloses the gear wheel (1), the worm (3), and the stepping motor (7–10) consists of two identical shells (11) developed substantially with mirror symmetry. In this way, a low cost manufacture, such as for the production of the mold and for the assembly, is possible. In this feature, it may be advantageous for individual parts to be mirror images, with regard to their position, but complementary to each other with respect to their development, as in the case of holes and pins for the connecting of the housing shells to each other. The connecting of the housing shells to each other by means of detents (snap-on connections) is possible.

It is furthermore preferable that receiving openings for contact pins (14 to 17) be present in the shells (11) in the vicinity of the ends of the winding of the stators (9; 10). In each case, one receiving hole in one of the shells is aligned with the corresponding receiving hole in the other shell, and the contact pins protrude on one side beyond the surface of the housing. In this way, assembling is further simplified and front or rear contacting is possible by corresponding insertion of the contact pins.

A firm seat of the contact pins can be obtained by providing the contact pins (14 to 17) with a stamping which is arranged symmetrically to a center of the housing, and the receiving holes have a stamping which extends conically towards the center of the housing.

The invention permits of numerous embodiments.

BRIEF DESCRIPTION OF THE DRAWING

With the above and other objects and advantages in view, the present invention will become more clearly understood in connection with the detailed description of a preferred embodiment when considered with the accompanying drawing, of which.

DETAILED DESCRIPTION OF THE PREFERRED EMBODIMENT

Figure 1:
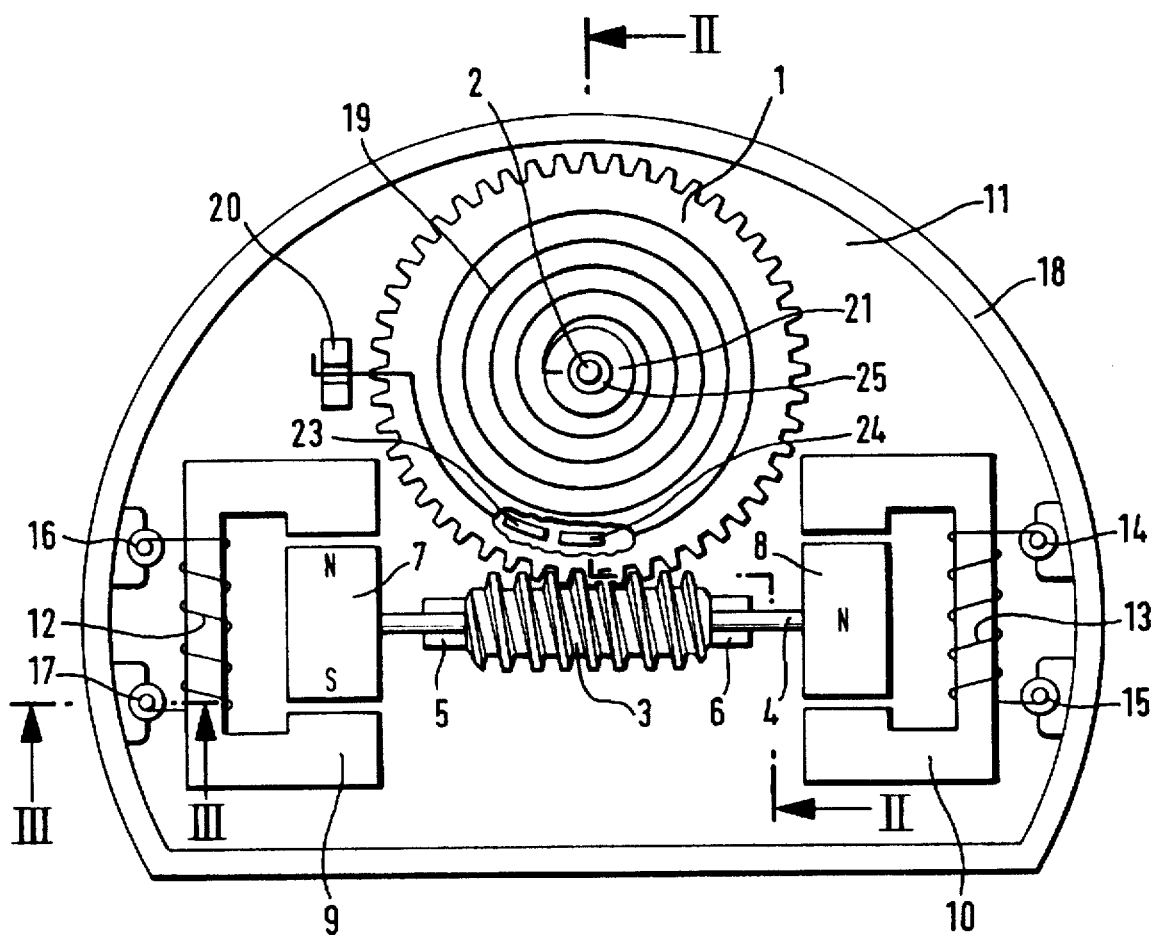
FIG. 1 is a view of the embodiment with the housing open.
Figure 2:
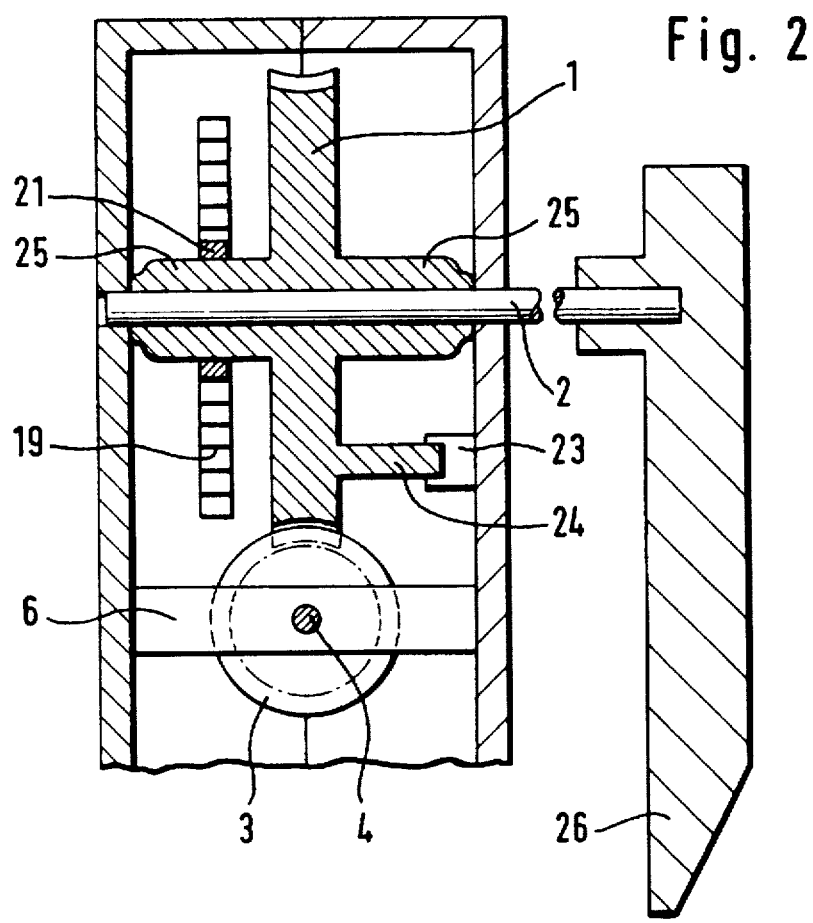
FIG. 2 is a section along the line II—II of FIG. 1.
Figure 3:
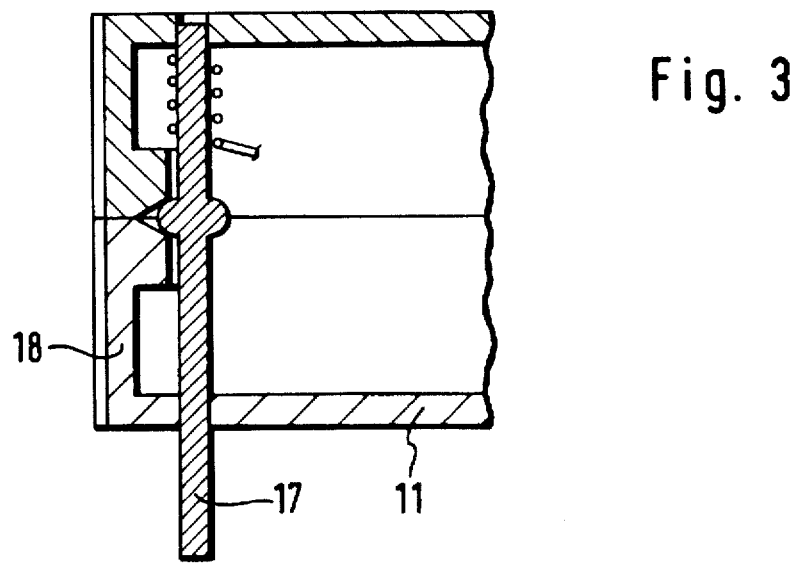
FIG. 3 is a section along the line III—III of FIG. 1.

Identical parts have been provided with the same reference numerals in the figures. FIGS. 2 and 3 are somewhat enlarged as compared with FIG. 1.

In the embodiment shown, a gear wheel 1 is located on the shaft 2 of a pointer 26 (FIG. 2). The gear wheel 1 is in engagement with a worm 3 disposed on a worm shaft 4 which, in its turn, is mounted for rotation in bearing brackets 5, 6. On the ends of the worm shaft 4 there are two rotors 7, 8, each of which has a north pole and a south pole and which are oriented 90° from each other. The corresponding stators 9, 10 are developed as stamped or bent parts, and can be developed in a flat configuration due to the splitting in two of the stepping motor and the 90° rotational displacement of the rotors so that they do not contribute to an increase in the structural depth. They are held by recesses (not shown in detail) in the housing shells, only one shell 11 being visible in FIG. 11. The diagrammatically shown coils 12, 13 are wound directly on the stators 9, 10 and their ends are connected by a wrap technique to contact pins 14, 15, 16 and 17. Each of the housing shells 11 has a rim 18 to close off the housing from the outside.

A spiral spring 19, which acts between a bearing 20 fixed firmly on the housing and a hub of the gear wheel 1, urges the gear wheel 1 against the worm 3 so that any play present between the gear wheel 1 and the worm 3 has no effect on the accuracy of the indication.

Stop parts 23, 24 are connected, on the one hand, to the stationary housing and, on the other hand, to the gear wheel 1 in order to limit the angle of rotation of the gear wheel 1. In order to make the stop parts 23, 24 visible in FIG. 1, a portion of the gear wheel 1 has been cut out.

The gear wheel 1 is furthermore provided with run-on domes 25 on both sides. By these run-on domes, axial play of the indicator shaft 2 is limited. Due to the fact that continuous bearings are present in both housing shells for the pointer shaft 2, the pointer shaft can be supported on the short shaft stubs upon the pressing-on of the pointer 26.

In the following, there will again be briefly summarized the possibilities for adapting the indicating device of the invention to different cases of use upon assembly despite identical individual parts. On the one hand, it is possible to place the worm shaft 4, together with the worm 3 and the rotors 7, 8, in two different directions. In that way, the influencing of the direction of rotation, with the electric control otherwise the same, is possible—similar to the aforementioned different insertion of the pointer shaft 2. On the other hand, the contact pins 14 to 17 can be inserted with the longer end protruding from the housing facing either downward or upward. In that way, a total of four different structural forms with respect to the direction of rotation and the contacting side are possible.

The flat compact structural form of the drive of the indicating device is attained by locating axes of the rotors 7, 8 and the worm shaft 4 within a plane of the gear wheel 1.

I claim:

1. An indicating device driven by a stepping motor, the indicating device comprising:

a stepping motor, a worm shaft with a worm, and a gear wheel which is in engagement with the worm;

wherein the worm shaft is connected to the stepping motor;

the stepping motor comprises two permanent-magnet rotors arranged fixed for rotation on opposite ends of the worm shaft, and two stators enclosing the rotors; and the rotors are arranged spaced from each other rotationally about the worm shaft by half a pole spacing.

2. An indicating device according to claim 1, further comprising a pointer shaft, and an indicating element having a pointer which is arranged, fixed for rotation, on the pointer shaft, the pointer shaft bearing the gear wheel.

3. An indicating device according to claim 1, further comprising a housing, and a spring connecting between the housing and the gear wheel, the spring serving to inhibit gearing play.

4. An indicating device according to claim 2, further comprising a housing, and a spring connecting between the housing and the gear wheel, the spring serving to inhibit gearing play.

5. An indicating device according to claim 1, further comprising stops which limit an angle of rotation of the gear wheel.

6. An indicating device driven by a stepping motor, the indicating device comprising:

a stepping motor, a worm shaft with a worm, and a gear wheel which is in engagement with the worm;

wherein the worm shaft is connected to the stepping motor;

the stepping motor comprises two permanent-magnet rotors arranged fixed for rotation on opposite ends of the worm shaft, and two stators enclosing the rotors;

the rotors are arranged spaced from each other rotationally about the worm shaft by half a pole spacing;

the indicating device further comprises an indicating element having a pointer which is arranged, fixed for rotation, on the pointer shaft, the pointer shaft bearing the gear wheel;

a housing, and run-on domes disposed on opposite ends of the pointer shaft; and wherein the run-on domes protrude further beyond the gear wheel whereby, upon insertion of the gear wheel during an assembling of the indicating device, the pointer shaft can extend as desired from the housing on either of its two sides and thus permit, in response to an electric control, rotation in clockwise direction or in counterclockwise direction.

7. An indicating device driven by a stepping motor, the indicating device comprising:

a stepping motor, a worm shaft with a worm, and a gear wheel which is in engagement with the worm;

wherein the worm shaft is connected to the stepping motor;

the stepping motor comprises two permanent-magnet rotors arranged fixed for rotation on opposite ends of the worm shaft, and two stators enclosing the rotors;

the rotors are arranged spaced from each other rotationally about the worm shaft by half a pole spacing; and the indicating device further comprises a housing, and bearing brackets located on the housing;

wherein the worm shaft is supported in the immediate vicinity of the ends of the worm by respective ones of the bearing brackets; and the bearing brackets are developed in one piece with the housing and are open to permit a snapping-in of the worm shaft into the bearing brackets.

8. An indicating device according to claim 1, further comprising a housing which encloses the gear wheel, the worm, and the stepping motor, the housing comprising two shells developed substantially with mirror symmetry.

9. An indicating device driven by a stepping motor, the indicating device comprising:

a stepping motor, a worm shaft with a worm, and a gear wheel which is in engagement with the worm;

wherein the worm shaft is connected to the stepping motor;

the stepping motor comprises two permanent-magnet rotors arranged fixed for rotation on opposite ends of the worm shaft, and two stators enclosing the rotors;

the rotors are arranged spaced from each other rotationally about the worm shaft by half a pole spacing;

the indicating device further comprises a housing which encloses the gear wheel, the worm, and the stepping motor, the housing comprising two shells developed substantially with mirror symmetry;

the stepping motor comprises two rotors disposed on opposite ends of the worm shaft and two stators with stator windings adjacent respective ones of the rotors;

the indicating device has contact pins for making electrical contact with the stator windings;

each of the housing shells has receiving openings for the contact pins in the vicinity of ends of the stator windings; and the respective ones of the receiving openings in respective ones of the shells are in alignment, and the contact pins protrude beyond the surface of a side of the housing.

10. An indicating device according to claim 9, wherein the contact pins are a stamping which is arranged symmetrically to a center of the housing, and the receiving holes are a stamping which extends conically towards the center of the housing.

11. An indicating device comprising:

an indicating element; and a drive comprising a stepping motor, a worm driven in rotation by the motor, and a gear wheel interconnecting the indicating element with the worm for imparting movement to the indicating element during operation of the motor;

wherein the motor comprises two permanent-magnet rotors coaxial with an axis of the worm and located on opposite ends of the worm, the gear wheel has a planar form, and the gear wheel is coplanar with an axis of the rotor; and the motor further comprises two stators enclosing respective ones of the two rotors, the rotors being arranged spaced from each other rotationally about the worm axis by half a pole spacing.

12. An indicating device comprising:

a stepping motor having a stator assembly and a rotor assembly for operation therewith:

wherein the rotor assembly has a drive shaft and two rotor sections secured to each other and to the shaft, the two rotor sections being spaced apart from each other along an axis of the shaft, each of the rotor sections having a north magnetic pole and a south magnetic pole, the two rotor sections being oriented relative to each other with a rotational displacement about the shaft axis of 90°;

wherein the stator assembly has two stator sections corresponding to the two rotor sections, the two stator sections being spaced apart from each other along the shaft axis; and the indicating device further comprises a worm gear on the shaft, and a gear wheel driven by the worm gear for positioning an indicator of the indicating device.

13. An indicating device according to claim 12, wherein the worm gear is located between the two rotor sections.

14. An indicating device according to claim 12, wherein the gear wheel is coplanar with the shaft to provide for a compact configuration of the indicating device.

* * * * *